(12) United States Patent
Zhu et al.

(10) Patent No.: US 12,162,502 B2
(45) Date of Patent: *Dec. 10, 2024

(54) VEHICLE OPERATION SAFETY MODEL TEST SYSTEM

(71) Applicant: Mobileye Vision Technologies Ltd., Jerusalem (IL)

(72) Inventors: Qianying Zhu, Beijing (CN); Lidan Zhang, Beijing (CN); Xiangbin Wu, Beijing (CN); Xinxin Zhang, Beijing (CN); Fei Li, Beijing (CN)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,887

(22) Filed: Sep. 6, 2023

(65) Prior Publication Data

US 2023/0406331 A1    Dec. 21, 2023

Related U.S. Application Data

(63) Continuation of application No. 17/789,426, filed as application No. PCT/IB2021/000886 on Dec. 17, 2021, now Pat. No. 11,772,666.

(30) Foreign Application Priority Data

Dec. 17, 2020    (WO) ................ PCT/CN2020/137375

(51) Int. Cl.
  *B60W 30/16*    (2020.01)
  *B60W 30/165*    (2020.01)
  (Continued)

(52) U.S. Cl.
  CPC ...... *B60W 50/0205* (2013.01); *B60W 30/162* (2013.01); *B60W 30/165* (2013.01);
  (Continued)

(58) Field of Classification Search
  None
  See application file for complete search history.

(56) References Cited

U.S. PATENT DOCUMENTS 9,493,161 B2 *   11/2016   Johansson ................ B60T 7/18
10,427,656 B2 *   10/2019   Zhang ...................... B60T 7/12
(Continued)

FOREIGN PATENT DOCUMENTS

CN    108230817         6/2018
CN    110214264 A       9/2019
(Continued)

OTHER PUBLICATIONS

"U.S. Appl. No. 17/789,426, Corrected Notice of Allowability mailed Aug. 18, 2023", 3 pgs.

(Continued)

*Primary Examiner* — Jonathan M Dager
(74) *Attorney, Agent, or Firm* — Schwegman Lundberg & Woessner, P.A.

(57) ABSTRACT

System and techniques for test verification of a control system (e.g., a vehicle safety system) with a vehicle operation safety model (VOSM) such as Responsibility Sensitive Safety (RSS) are described. In an example, using test scenarios to measure performance of VOSM includes: defining safety condition parameters of a VOSM for use in a test scenario configured to test performance of a safety system; generating a test scenario, using the safety condition parameters, the test scenario generated as a steady state test, a dynamic test, or a stress test; executing the test scenario with a test simulator, to produce test results for the safety system; measuring real-time kinematics of the safety system, during execution of the test scenario, based on compliance with the safety condition parameters; and producing a parameter rating for performance of the safety system with the VOSM, (Continued)

based on the test results and the measured real-time kinematics.

28 Claims, 5 Drawing Sheets

(51) Int. Cl.
  *B60W 50/02* (2012.01)
  *B60W 60/00* (2020.01)
(52) U.S. Cl.
  CPC ..... *B60W 60/0015* (2020.02); *B60W 2520/00* (2013.01); *B60W 2552/00* (2020.02); *B60W 2554/404* (2020.02)

(56) References Cited

U.S. PATENT DOCUMENTS

| | | | | |
|---|---|---|---|---|
| 11,066,072 | B2* | 7/2021 | Kim | B60W 50/14 |
| 11,772,666 | B2 | 10/2023 | Zhu et al. | |
| 2010/0280729 | A1* | 11/2010 | Samsioe | B60W 10/196 |
| | | | | 701/93 |
| 2011/0137631 | A1* | 6/2011 | Komatsu | G05B 19/4063 |
| | | | | 703/6 |
| 2018/0148063 | A1* | 5/2018 | Tatsushiro | B60W 30/18009 |
| 2019/0291727 | A1* | 9/2019 | Shalev-Shwartz | G08G 1/166 |
| 2019/0337507 | A1* | 11/2019 | Stein | B60W 50/0097 |
| 2019/0377352 | A1* | 12/2019 | Weißwange | B60W 60/0027 |
| 2019/0391259 | A1* | 12/2019 | Shimizu | B60W 30/16 |
| 2020/0023845 | A1* | 1/2020 | Wang | B60W 30/095 |
| 2020/0377109 | A1* | 12/2020 | Yang | B60W 10/10 |
| 2021/0110484 | A1* | 4/2021 | Shalev-Shwartz | G05D 1/0088 |
| 2021/0269065 | A1* | 9/2021 | Haggblade | B60W 30/18154 |
| 2022/0016939 | A1* | 1/2022 | Doraiswamy | G06N 3/084 |
| 2022/0017090 | A1* | 1/2022 | Sams | G06F 30/15 |
| 2022/0227367 | A1* | 7/2022 | Kario | B60W 30/0956 |
| 2022/0315052 | A1* | 10/2022 | Oboril | B60W 60/00274 |
| 2022/0379894 | A1* | 12/2022 | Itoh | G08G 1/16 |
| 2023/0028035 | A1* | 1/2023 | Haggblade | B60W 50/00 |
| 2023/0043905 | A1 | 2/2023 | Zhu et al. | |

FOREIGN PATENT DOCUMENTS

| | | |
|---|---|---|
| CN | 110597711 A | 12/2019 |
| CN | 110928319 A | 3/2020 |
| CN | 111783226 | 10/2020 |
| CN | 112014115 A | 12/2020 |
| CN | 115777088 A | 3/2023 |
| DE | 102019124615 A1 | 3/2020 |
| DE | 112021001037 T5 | 1/2023 |
| WO | WO-2019053068 A1 | 3/2019 |
| WO | WO-2022130019 A1 | 6/2022 |

OTHER PUBLICATIONS

"U.S. Appl. No. 17/789,426, Non Final Office Action mailed Feb. 1, 2023", 10 pgs.

"U.S. Appl. No. 17/789,426, Notice of Allowance mailed May 24, 2023", 7 pgs.

"U.S. Appl. No. 17/789,426, Preliminary Amendment filed Jun. 27, 2022", 11 pgs.

"U.S. Appl. No. 17/789,426, Response filed Apr. 21, 2023 to Non Final Office Action mailed Feb. 1, 2023", 13 pgs.

"Chinese Application Serial No. 202180015179.6, Office Action mailed May 25, 2023", w/ English Claims, 21 pgs.

"International Application Serial No. PCT/IB2021/000886, International Preliminary Report on Patentability mailed Jun. 29, 2023", 5 pgs.

"International Application Serial No. PCT/IB2021/000886, International Search Report mailed Apr. 4, 2022", 2 pgs.

"International Application Serial No. PCT/IB2021/000886, Written Opinion mailed Apr. 4, 2022", 3 pgs.

"Chinese Application Serial No. 202180015179.6, Office Action mailed Dec. 8, 2023", w English Translation, 17 pgs.

"Chinese Application Serial No. 202180015179.6, Response filed Oct. 8, 2023 to Office Action mailed May 25, 2023", w English claims, 26 pgs.

"German Application Serial No. 112021001037.9, Office Action mailed Aug. 13, 2024", w machine English translation, 11 pgs.

* cited by examiner

VEHICLE OPERATION SAFETY MODEL TEST SYSTEM

PRIORITY

This application is a continuation of U.S. patent application Ser. No. 17/789,426, filed Jun. 27, 2022, which is a U.S. National Stage Application under 35 U.S.C. 371 from International Application No. PCT/IB2021/000886, filed Dec. 17, 2021, and published as WO 2022/130019 on Jun. 23, 2022, which claims the benefit of priority to International Application No. PCT/CN2020/137375, filed Dec. 17, 2020, each of which are incorporated herein by reference in their entirety.

TECHNICAL FIELD

Embodiments described herein generally relate to automated driving or driver assisted driving and more specifically to a test system for ensuring compliance with parameters of one or more safety models.

BACKGROUND

Autonomous driving and driver assistance systems are becoming more common place. These systems use vehicle sensor data to control, or help control (e.g., via driver prompts, partial steering input, emergency braking, etc.) the vehicle. Autonomous driving systems can fully control the vehicle without driver assistance, whereas assisted driving systems augment a driver's control of the vehicle. Assisted driving systems may be referred to as advanced driver assistance systems (ADAS) systems, developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

While autonomous driving and ADAS systems have incorporated various safety features, there is movement to create verifiable safety models for the operation of vehicles. These models tend to formalize the parameters of motion and interaction between vehicles, use those parameters to model vehicle presence in the world, and define acceptable interactions between vehicles based on the vehicle presence. One such vehicle operation safety model (VOSM) is Responsibility-Sensitive Safety (RSS).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
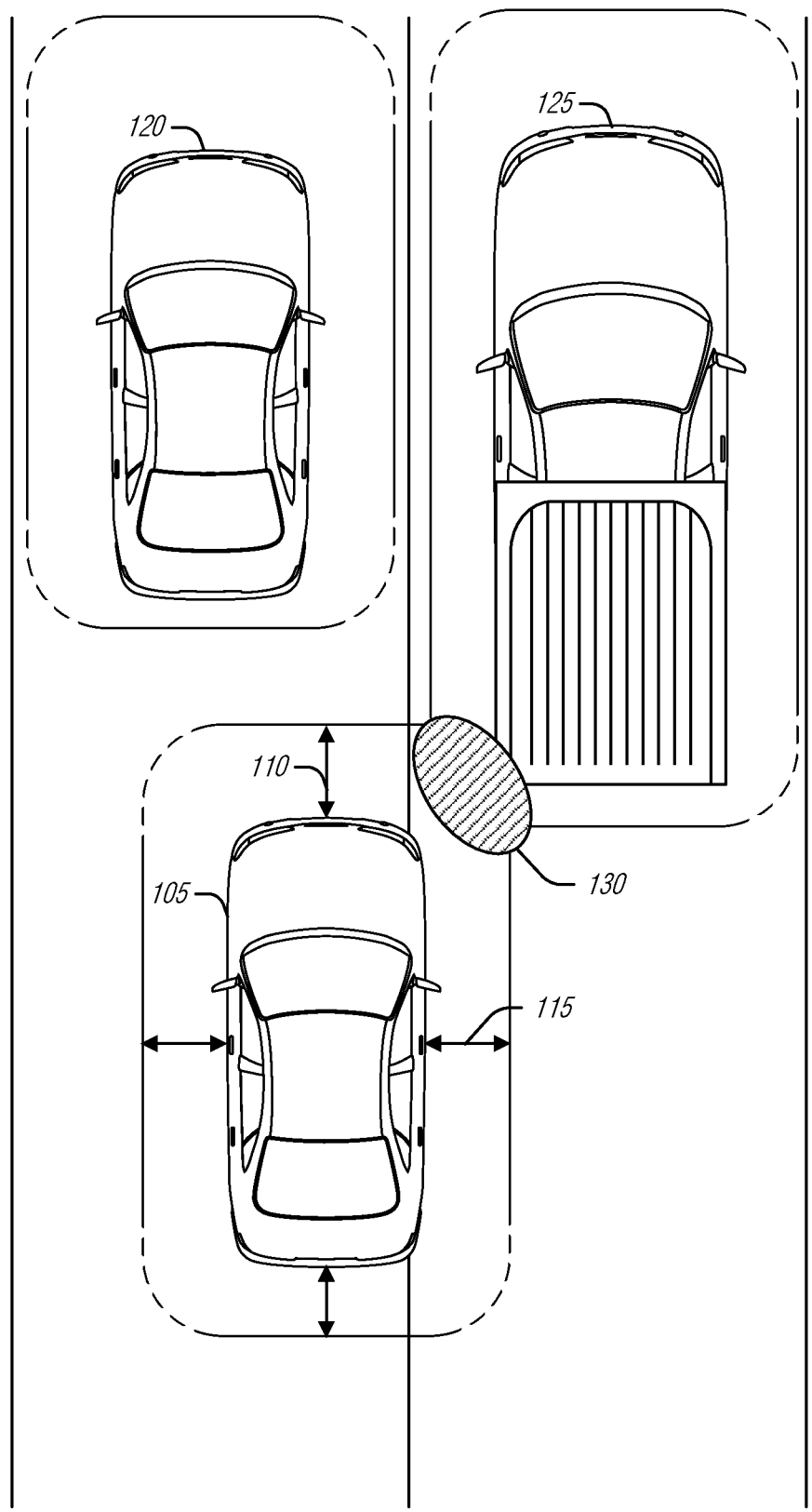
FIG. 1 illustrates an example of a moving vehicle scenario demonstrating an autonomous vehicle operation safety model, according to an embodiment.

Many of the scenarios and examples discussed below will reference RSS, although most are equally applicable to other VOSMs. RSS defines several parameters of individual vehicles and uses these parameters to model, among other things, a set of distances which determine whether a vehicle is safe or not. Generally, the safe distances address sufficient longitudinal distance and sufficient lateral distance. This is discussed below with reference to FIG. 1, which explains the relation of these distances in a safety model.

RSS is a mathematical model for safety assurance during automatous driving. RSS formulates a set of safety standards, such as the minimum distance $d_{min}$, between vehicles to avoid collisions. Multiple parameters are used to calculate the formulation, such as response time $\rho$, minimum braking $\alpha_{min,brake}$ and maximum acceleration $\alpha_{max,brake}$ of the vehicle. If all requirements are satisfied, the vehicle passes the RSS standards and is believed to be safe, otherwise the vehicle is not safe.

Various forms of safety requirements are being developed to standardize RSS approaches. For example, the China ITS standard "Technical Requirement of Safety Assurance of AV Decision Making" (T/ITS 0116-2019) establishes an RSS-based safety standard for use in in China. To advance the usage of this standard, testing standards are also being developed. It is expected that a testing standard will require execution of three parts: simulation test, field test and road test. The simulation test will be executed first before field test and road test. The following proposes a simulation testbed to address the following problems involved with existing testing approaches and infrastructures for simulation tests.

In many scenarios, it is a challenge to invoke RSS-specific test flows and working condition parameters. AV developers usually use some typical traffic scenarios as test cases to test the performance of an autonomous driving system (ADS), such as by following a leading vehicle, lane changing, crossing road intersection, etc. The working condition parameters for these scenarios are derived from real traffic data, or randomly chosen by the scenario designers. However, these test cases together with their working condition parameters typically cannot be used for testing compliance with RSS directly, because such scenarios do not have direct numerical relationships with the RSS rules, and do not reflect the real-world capability of an RSS functional module (as implemented by different vendors).

To address this scenario, the following proposes RSS-specific test cases together with specific working condition parameters for RSS test verification. In an example verification process, all working condition parameters are calculated backward from the RSS formula. Additionally, in order to accurately evaluate and quantize the test result, the following proposes RSS-specific criteria which can reflect the actual capability of the RSS functional module under test. Further, the following proposes RSS-specific functional modules which can enhance a conventional AV simulation test system and allow its adaptation for meeting the requirements of an RSS test scenario.

FIG. 1 illustrates an example of a moving vehicle scenario demonstrating an autonomous vehicle operation safety model, according to an embodiment. As illustrated, an ego vehicle 105 shares the road with two target vehicles, the sedan 120 and the truck 125. Here, "ego vehicle" refers to the vehicle from which a certain perspective is obtained and a target vehicle is a subject within that perspective.

RSS is a mathematical model for safety assurance during automatous driving. It formulates a set of safety standards, such as the minimum distance d min between vehicles to avoid collisions. Multiple parameters are used to calculate the formulation, such as response time ρ, minimum braking $\alpha_{min,brake}$ and maximum acceleration $\alpha_{max,brake}$ of the vehicle. If all requirements are satisfied, the vehicle passes the RSS standards and is believed to be safe, otherwise the vehicle is not safe.

RSS defines a safe longitudinal distance 110 and a safe lateral distance 115 for the ego vehicle 105. These distances create a zone, shell, bubble, or shield around the ego vehicle 105, also illustrated around the sedan 120 and the truck 125. Generally, violation of these safe distances (e.g., intersection or overlap 130) indicates that the ego vehicle 105 is not safe and should take corrective action. Note that the intersection 130 need not result in a collision, merely that, according to RSS, an unsafe situation has arisen.

The RSS model provides the following representations of safe longitudinal and lateral distances respectively:

$$d_{min} = \left[ v_r\rho + \frac{1}{2}a_{max,accel}\rho^2 + \frac{(v_r + \rho a_{max,accel})^2}{2a_{min,brake}} - \frac{v_f^2}{2a_{max,brake}} \right]_+$$

Equation (1)

$$d_{min} = \mu + \left[ \frac{2v_1 + \rho_1 a_{1,max,accel}^{lat}}{2}\rho_1 + \frac{(v_1 + \rho_1 a_{1,max,accel}^{lat})^2}{2a_{1,min,brake}^{lat}} - \left( \frac{2v_2 - \rho_2 a_{2,max,accel}^{lat}}{2}\rho_2 - \frac{(v_2 - \rho_2 a_{2,max,accel}^{lat})^2}{2a_{2,min,brake}^{lat}} \right) \right]_+$$

Equation (2)

With respect to the safe longitudinal distance of Equation (1), $\alpha_{max,accel}$ and $\alpha_{min,brake}$ are the maximum acceleration rate and minimum braking rate of the ego vehicle 105 ($c_r$), and ρ is the response time of the ego vehicle 105. With respect to the safe lateral distance of equation (2), $\rho_1$ and $\rho_2$ are the response time of the ego vehicle 105 ($c_1$) and a target vehicle ($c_2$) such as the truck 125. Also, $\alpha_{1max,accel}^{lat}$ and $\alpha_{1,min,brake}^{lat}$ are respectively the maximum acceleration rate and minimum braking rate of $c_1$, $\alpha_{2,max,accel}^{lat}$ and $\alpha_{2,min,brake}^{lat}$ are respectively the maximum acceleration rate and minimum braking rate of $c_2$.

For clarity, the result from Equation (1) is referred to as the minimum safe longitudinal distance and the result from Equation (2) is referred to as the minimum safe lateral distance. When the ego vehicle detects that it is closer than either the minimum safe longitudinal distance or the minimum safe lateral distance, the ego vehicle 105 is expected to implement a corrective action. Such corrective actions may include braking or turning to increase the distance between the ego vehicle 105 and the target vehicle 125 or other object until the minimum safe longitudinal distance and the minimum safe lateral distance are restored.

Equations (1) and (2) above illustrate the parameterization of the safety model to response times of the ego vehicle 105 and the target vehicle 125, maximum lateral or longitudinal acceleration of the target vehicle and minimum braking (e.g., deceleration) of the ego vehicle. Here, maximum acceleration is the greatest acceleration capable by a vehicle and minimum braking is the deacceleration a vehicle can guarantee will be applied when executing a maneuver. Thus, if the vehicle is in peak operating condition, the maximum and minimum braking may be the same. However, if, for example, the ego vehicle 105 has worn brakes, the minimum braking for the ego vehicle 105 is reduced from the maximum braking based on the brake wear.

Actual values used for the maximum and minimum of either braking or acceleration are generally defined by a manufacturer of the ego vehicle 105, or defined by the VOSM, among other places. These values are defined to provide a realistic safety margin given equations (1) and (2). It is noted that the equations (1) and (2) generally assume a worst case scenario in which the ego vehicle 105 is underperforming (thus the use of the minimum braking for the ego vehicle) and the target vehicle 125 is at peak performance (thus the use of maximum acceleration for the target vehicle 125) even though it is more likely that the ego vehicle 105 will outperform its minimum braking and the target vehicle 125 will underperformed its maximum acceleration.

By using the Equations (1) and (2), the danger zone is defined around the ego vehicle 105. As noted above, when another object interferes with this zone, or is projected to interfere with the zone, then the ego vehicle 105 is expected to take action. Because the velocities of both the ego vehicle 105 and the target vehicle 125 are parameters of equations (1) and (2), the danger zone is constantly changing based on the detected movement of the ego vehicle 105 and the target vehicle 125.

Other VOSMs will generally follow the RSS VOSM template described above by defining relevant parameters and providing for acceptable vehicle interactions based on those parameters.

A simulation testbed commonly includes a simulator, scenario engine, data logging, and rating. A variety of driving simulators, such as CARLA, MATLAB, have been widely adopted for use. Each simulator has its own scenario engine, such as scenario runner for CARLA, or scenario designer of MATLAB. The criteria for such test scenarios usually include safety, task completion, driving smoothness, compliance of traffic policy etc. The test cases used in simulation often involve typical traffic scenarios, such as lane changing, following a leading vehicle, crossing road intersections, etc. The simulation working condition parameters are usually derived from real traffic data, such as Natural Driving Study (NDS), or randomly chosen by designers The traditional test cases together with their working condition parameters cannot be used to directly evaluate RSS or another VOSM functionality. RSS rules are based on rigorous mathematical formulas and have their own operational domain. The test cases and parameters, to be successful, must meet the operation domain of RSS functional units and reflect the actual capability of an RSS functional unit under test. However, conventional simulation testbeds lack essential functional modules for RSS and VOSM test and rating.

The following proposes RSS-specific test cases together with specific working condition parameters for RSS testing. In an example, working condition parameters are calculated backward from RSS formulas, and deployed into test scenarios. The following also proposes RSS-specific functional modules which can be embedded into traditional simulation system for RSS simulation and rating, include the use of an RSS-specific real time kinematics (RTK) status checker and an RSS-based rating module which produces relevant rating criteria.

The proposed RSS-specific test method and working condition parameters can be used for verifying compliance with a formalized RSS test standard, or other similar types of standards which are under development. The proposed RSS-specific functional modules are also adapted for use in a qualified RSS simulation testbed and for use with a commercial test system used for verifying RSS standard compliance. It will be apparent that other scenarios and benefits of the following architectures and methods may also be provided.

Figure 2:
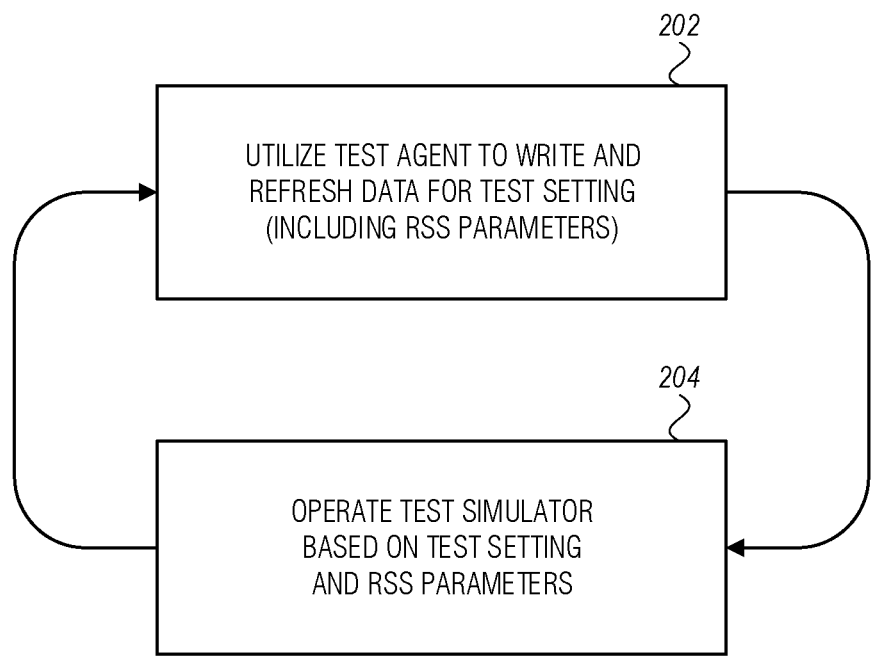
FIG. 2 illustrates an example workflow for operating a safety model simulation testbed, according to an embodiment.

FIG. 2 illustrates an example workflow for operating a safety model simulation testbed, according to an embodiment. Specifically, this workflow involves the use of a test agent (at operation 202) to write and refresh data for a test setting, including providing RSS parameters to test compliance with some RSS requirement. This workflow is then followed by operation of the test simulator, based on the test setting and the RSS parameters (at operation 204).

The testing examples used herein specifically verify the compliance with RSS standards such as those relating to safe longitudinal distance, although other VOSMs or specific safety scenarios may also be used. For example, a safe lateral distance from RSS may be verified, or vehicle trajectory intercepts (e.g., intersections, overlaps, etc.) from other VOSMs may be verified with appropriate adjustment of the parameters.

According to the current version of RSS, the minimum longitudinal safe distance is defined by equation (1), reproduced below:

$$d_{min}^{long} = \left[ v_r \rho + \frac{a_{max,accel}^{long} \rho^2}{2} + \frac{(v_r + \rho a_{max,accel}^{long})^2}{2 a_{min,brake}^{long}} - \frac{v_f^2}{2 a_{max,brake}^{long}} \right]_+$$

here the notation $[X]_+ := \max\{x, 0\}$, and where:
 $v_f$: longitudinal speed of the front vehicle;
 $\alpha_{max,brake}^{long}$: the maximum braking acceleration of the front vehicle;
 $v_r$: the longitudinal speed of the rear vehicle;
 $\rho$: the response time of the rear vehicle;
 $\alpha_{max,accel}^{long}$: the maximum forward acceleration of the rear vehicle;
 $\alpha_{min,brake}^{long}$: the minimum braking acceleration of the rear vehicle.

When the distance between the rear vehicle and the front vehicle equal or less than the minimum longitudinal safe distance, the rear vehicle should continue advancing with the acceleration no more than the maximum longitudinal acceleration ($\alpha_{max,brake}^{long}$) during the response time, then the rear vehicle should decelerate with the braking acceleration no less than the minimum longitudinal braking acceleration ($\alpha_{min,brake}^{long}$) until the rear vehicle is completely stopped or the longitudinal dangerous situation is released (e.g., there is no more longitudinal dangerous situation).

Given the above, the test technique may be adapted to verify the compliance of a safety module which attempts to detect and respond to unsafe conditions, and comply with RSS or other VOSM requirements.

Figure 3:
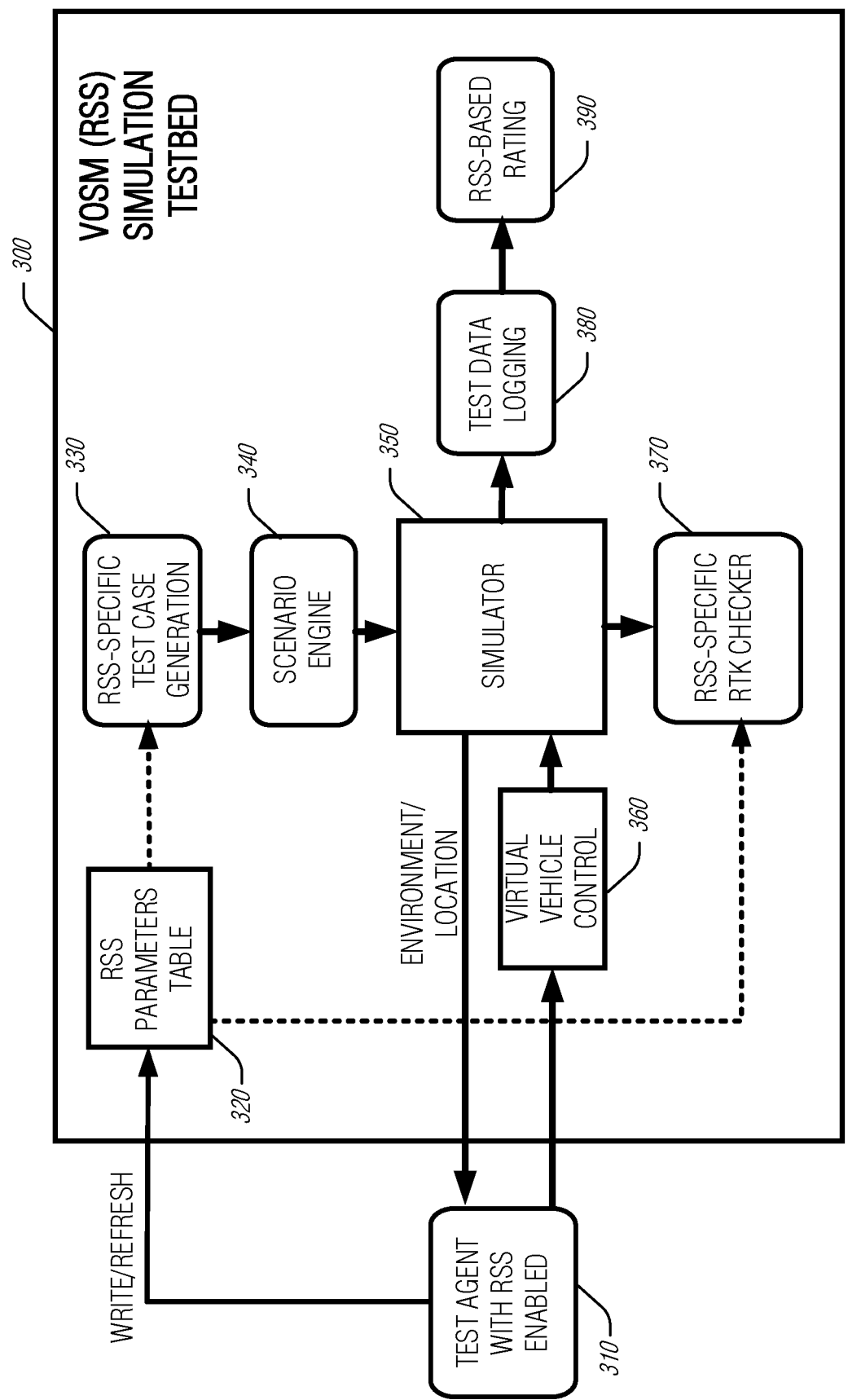
FIG. 3 illustrates an example of a system framework for a safety model simulation testbed, according to an embodiment.

FIG. 3 illustrates a system framework of a proposed simulation testbed, using RSS as the VOSM. The functional modules of the simulation testbed 300 (e.g., implemented in hardware with software programming) may include the following components:

a) Simulator 350. This simulator 350 may be provided by any of a number of professional driving simulators, including CARLA, MATLAB, Apollo etc. The simulator renders 3D virtual scene in real time, calculates real time kinematics of a virtual vehicle, and provides a control interface to user.

b) Scenario engine 340. The scenario engine 340 parses scenario specifications and then builds a test scenario in the simulator 350. The scenario engine 340 can be independent from the simulator 350 or be embedded in the simulator 350.

c) Test data logging 380. This module records all runtime data during simulation, including a status of the ego vehicle and other actors, events (collision, violation of traffic policy, etc.) and environment information. The data log can be used for replay, debug and performance assessment.

d) Virtual vehicle control 360. This module is used to convert a output from a test agent 310 to a control signal of the virtual vehicle (throttle/brake/wheel, or target speed/acceleration/waypoint).

A traditional AD simulation infrastructure lacks functional modules for RSS testing; thus, the following introduces use of additional safety model-specific functional modules in the testbed 300, to enable a test to the specific VOSM model (e.g., RSS model). These modules include use and involvement of safety model parameters, as introduced in detail as below.

e) RSS parameters table 320. As noted with reference to FIG. 1 and the discussion of Equations (1) and (2), a core idea of RSS is to maintain a safe longitudinal distance and a safe lateral distance for the ego vehicle. The parameters for the safety model, such as the parameters used in Equations (1) and (2), discussed above, are referred to in the following paragraphs as RSS parameters.

The value of the RSS parameters depends on multiple factors, including the real dynamic characteristics of the ego vehicle under test, driving environment, road condition, and experimental result. Each test agent from different vendors has its own mechanism to determine the RSS parameters. Depending on the specific implementation, the RSS parameters can be a set of fixed values, or can be adaptively adjusted according to environments or road conditions.

The RSS parameters table 320 is used to receive the RSS parameters values from test agent under test and store them in a table during the simulation test. If the test agent 310 uses a set of fixed RSS parameter values, the table will be written only once at the beginning; if the test agent uses a set of adaptive RSS parameters, the table needs to be refreshed in real time.

Additionally, the RSS parameters table can be used by other modules for different purposes, which will be introduced in the next sections.

f) RSS-specific test case generation 330. This module 330 is used to generate RSS-specific test cases together with their simulation working conditions parameters according to the RSS parameters table. In order to assess the performance of RSS functionality in test agent, the following three RSS test cases may be generated:

1) Steady state test. This steady state test is designed to test if the ego vehicle and the target vehicle can achieve a relatively steady state during normal driving, which means they have the same velocity and the distance between them stays basically unchanged. The test flow for a steady state test is described as follows:

Step 1: The ego vehicle and target vehicle together with other actors start driving at some initial conditions (initial location, initial velocity and initial acceleration) along a given route.

Step 2: The target vehicle keeps driving along the route at constant velocity, and the ego vehicle approaches the target vehicle either longitudinally or laterally.

Step 3: If the RSS functional module of ego vehicle works effectively, the ego vehicle will stop approaching the target vehicle when the longitudinal distance or lateral distance is close to the minimum safe distance. Finally, the velocity of ego vehicle is equal to the target vehicle's velocity, and the distance stays unchanged (distance≥minimum safe distance).

2) Dynamic test. A dynamic test is designed to test the dynamic response capability of ego vehicle after it reaches the relatively steady state against the target vehicle. In a dynamic test, the ego-vehicle is expected to response to the action of target vehicle (braking or lateral movement), and maintain the longitudinal/lateral safe distance. The test flow for a dynamic test is described as follows:

Step 1: The ego vehicle and target vehicle together with other actors start driving at some initial conditions (initial location, initial velocity and initial acceleration) along a given route.

Step 2: The target vehicle keeps driving along the route at constant velocity, and the ego vehicle approaches the target vehicle either longitudinally or laterally. Finally, the ego vehicle reaches the relatively steady state against the target vehicle, in which the velocity of ego vehicle is equal to the target vehicle's velocity, and the distance stays unchanged (distance≥minimum safe distance).

Step 3: The target vehicle brakes longitudinally at a certain deceleration $\alpha_{brake}$ ($\alpha_{brake} < \alpha_{max,brake}$), or laterally moves to ego vehicle at a certain acceleration $\alpha_{2,accel}^{lat}$ ($\alpha_{2,accel}^{lat} < \alpha_{2,max,accel}^{lat}$) during the response time $p_2$ and then immediately brakes by at least the minimum reasonable braking force $\alpha_{2,min,brake}^{lat}$. The ego vehicle should take proper response to maintain the safe distance.

3) Stress test. The stress test is used to test the ego vehicle's ultimate response capability in a worst case. The test flow for a stress test is described as follows:

Step 1: The ego vehicle and target vehicle together with other actors start driving at some initial conditions (initial location, initial velocity and initial acceleration) along a given route.

Step 2: The ego vehicle approaches the target vehicle longitudinally at maximum acceleration $\alpha_{max,accel}$, or approaches the target vehicle laterally at maximum acceleration $\alpha_{1,max,accel}^{lat}$.

Step 3: When the distance between ego vehicle and target vehicle reduces to the minimal safe distance which is calculated using the real time RSS parameters, the target vehicle start braking longitudinally at maximum deceleration $\alpha_{max,brake}$, or laterally moves to ego vehicle at maximum acceleration $\alpha_{2,max,accel}^{lat}$ during the response time $p_2$ and then immediately brakes by at least the minimum reasonable braking force $\alpha_{2,min,brake}^{lat}$.

The ego vehicle is expected to take proper response to maintain the safe distance.

g) RSS-specific RTK checker 370. This module is used to measure the real-time kinematics (RTK) of a virtual vehicle during the test (e.g., a steady state test, dynamic test, and stress test), and then check if it complies with the values in RSS parameters table.

In an example, the RTK parameters include:

i) $v_r$, which means the longitudinal velocity of ego-vehicle at moment t ii) $\alpha_{accel}$ which means the longitudinal acceleration of ego-vehicle at moment t. With f being the frame rate of simulation, $\alpha_{accel}$ can be calculated by:

$$\alpha_{accel} = \Delta v_r \cdot f$$

iii) $\alpha_{brake}$, which means the deceleration of ego-vehicle at moment t. With f being the frame rate of simulation, this value can be calculated by:

$$\alpha_{brake} = -\Delta v_r \cdot f$$

iv) $v_1^{lat}$, which means the lateral velocity of ego-vehicle at moment t.

v) $\alpha_{1,accel}^{lat}$, which means the lateral acceleration of ego-vehicle at moment t. With f being the frame rate of simulation, this value can be calculated by:

$$\alpha_{1,accel}^{lat} = \Delta v_1^{lat} \cdot f$$

vi) $\alpha_{1,brake}^{lat}$, which means the lateral deceleration of ego-vehicle at moment t. With f being the frame rate of simulation, this value can be calculated by:

$$\alpha_{1,brake}^{lat} = -\Delta v_1^{lat} \cdot f$$

vii) $\rho_{measured}$, which means the measured response time of ego-vehicle. $\rho_{measured}$ can be calculated by:

$$\rho_{measured} = T_{action} - T_{violation}$$

In this example, $T_{violation}$ is the moment that the minimum longitudinal or lateral safe distance is violated, and $T_{action}$ is the moment that the ego-vehicle takes action to recover the safe distance, e.g., braking.

The measured RTK parameters must comply with the preset RSS parameters table written by test agent, according to the following principles:

$$a_{accel} \leq a_{max,accel} \quad \quad 1)$$

$$a_{brake} \geq a_{min,brake} \quad \quad 2)$$

$$a_{1,brake}^{lat} \leq a_{1,max,accel}^{lat} \quad \quad 3)$$

$$a_{1,brake}^{lat} \geq a_{1,min,brake}^{lat} \quad \quad 4)$$

$$|\rho_{measured} - \rho| \leq \frac{N}{f}. \quad \quad 5)$$

N is recommended to be 1 or 2. f is the frame rate of simulation.

In an example, the RSS-specific RTK checker 370 detects any violation of the five principles and reports the violation.

h) RSS-based rating 390. There are existing performance indicators widely used for ADS overall performance rating, e.g., safety, comfort, natural driving, and ecology. However, the present simulation testbed focuses on an RSS functionality test, so the following specific performance indicators for RSS functionality may be calculated.

1) Quick response capability $S_{qrc}$. The response time of ego vehicle is the time delay from the moment the violation of minimum safe distance occurs to the moment ego vehicle takes action to recover the safe distance. The smaller response time means better RSS functionality and improved safety, and thus it can be a performance indicator of RSS functional module. This may be measured by:

$$S_{qrc} = \frac{\rho_{ref}}{\rho_{measured}}$$

$\rho_{ref}$ is the reference response time, which may be defined as 200 ms in an RSS standard. $\rho_{measured}$ is the actual measured response time.

2) RSS parameters violation $S_{rpv}$. This criterion indicates if the RTK of virtual vehicle complies with the declared RSS parameters. In the testbed 300, the module of RSS-specific RTK checker 370 can provide the check result of RSS parameters violation. $S_{rpv}$ is equal to the number of the violated RSS parameters.

3) RSS functional effectiveness $S_{rfe}$. This criterion indicates if ego-vehicle can detect the violation of minimum safe distance and then take action to avoid a collision successfully under given simulation working condition.

$$S_{rfe} = \sum_{n=1}^{N} R_n;$$

$$R_n = \begin{cases} 1 (\text{if test case } n \text{ passes}) \\ 0 (\text{if test case } n \text{ fails}) \end{cases}$$

$R_n$ is the test result of RSS test case n, and it should be 0 or 1. N is the total number of executed RSS tests.

4) RSS functional usability $S_{rfu}$. An RSS functional module tends to use a much larger following distance to avoid potential risk of collision, and reduce sharp acceleration, sudden braking, and frequently switching between acceleration and braking, which will make passengers uncomfortable. However, the larger following distance also reduces the usability of RSS functionality in a real traffic environment. This criterion is proposed to evaluate RSS functional usability, which can be quantized by:

$$S_{rfu} = \int_0^T |d_t - d_{safe,t}| dt$$

T is the simulation period; de is the actual distance at moment t; $d_{safe,t}$ is the minimum safe distance at moment t.

Accordingly, the RSS-based rating 390 is used to assess the performance of an RSS functional module (e.g., provided by a vehicle manufacturer or vehicle service provider) according to above performances indicators.

Figure 4:
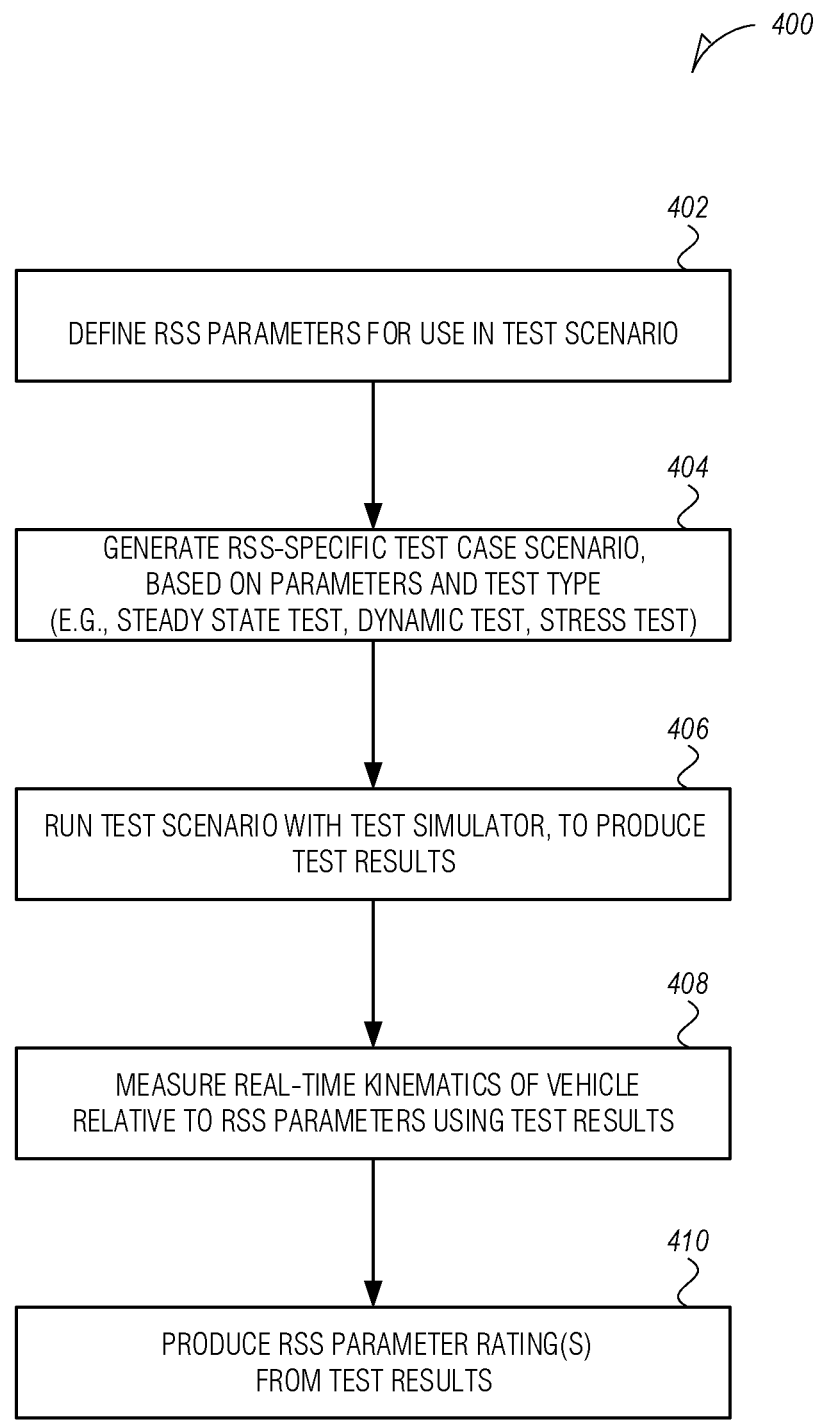
FIG. 4 illustrates an example of a process flow for configuration and use of a test system, with application of vehicle safety operational model parameters, according to an embodiment.

FIG. 4 depicts a flowchart 400 of a method for configuration and use of a test system, for application of vehicle safety operational model parameters, according to the present techniques. As discussed herein, this method may be used for verifying or measuring compliance of some safety system (e.g., vehicle control system software) with a VOSM, in a test setting. In the following flowchart, specific reference to RSS is provided, but other VOSMs may also be tested and applied.

Operation 402 includes defining RSS parameters (or other safety condition parameters) for use in the test scenario, as the test scenario is configured to test performance of the relevant safety system. This operation may be performed with use of the RSS parameters table 320, as discussed above.

Operation 404 includes generating an RSS-specific test case scenario, based on the RSS parameters and a test type to attempt (e.g., steady state test, dynamic test, stress test). This may be performed with the test case generation module 330, as discussed above.

Operation 406 involves executing the test scenario with a test simulator, to produce test results for the safety system. This may be performed with the scenario engine 340 and simulator 350, as discussed above.

Operation 408 involves measuring real-time kinematics of the safety system, during execution of the test scenario, based on compliance with the RSS parameters. This may be performed with the RSS-specific RTK checker 370, as discussed above.

Operation 410 involves producing one or more parameter ratings for performance of the safety system with RSS (or the other VOSM being tested), based on the test results and the measured real-time kinematics. This may be performed with use of the logging 380 and the RSS-based rating 390, as discussed above.

Figure 5:
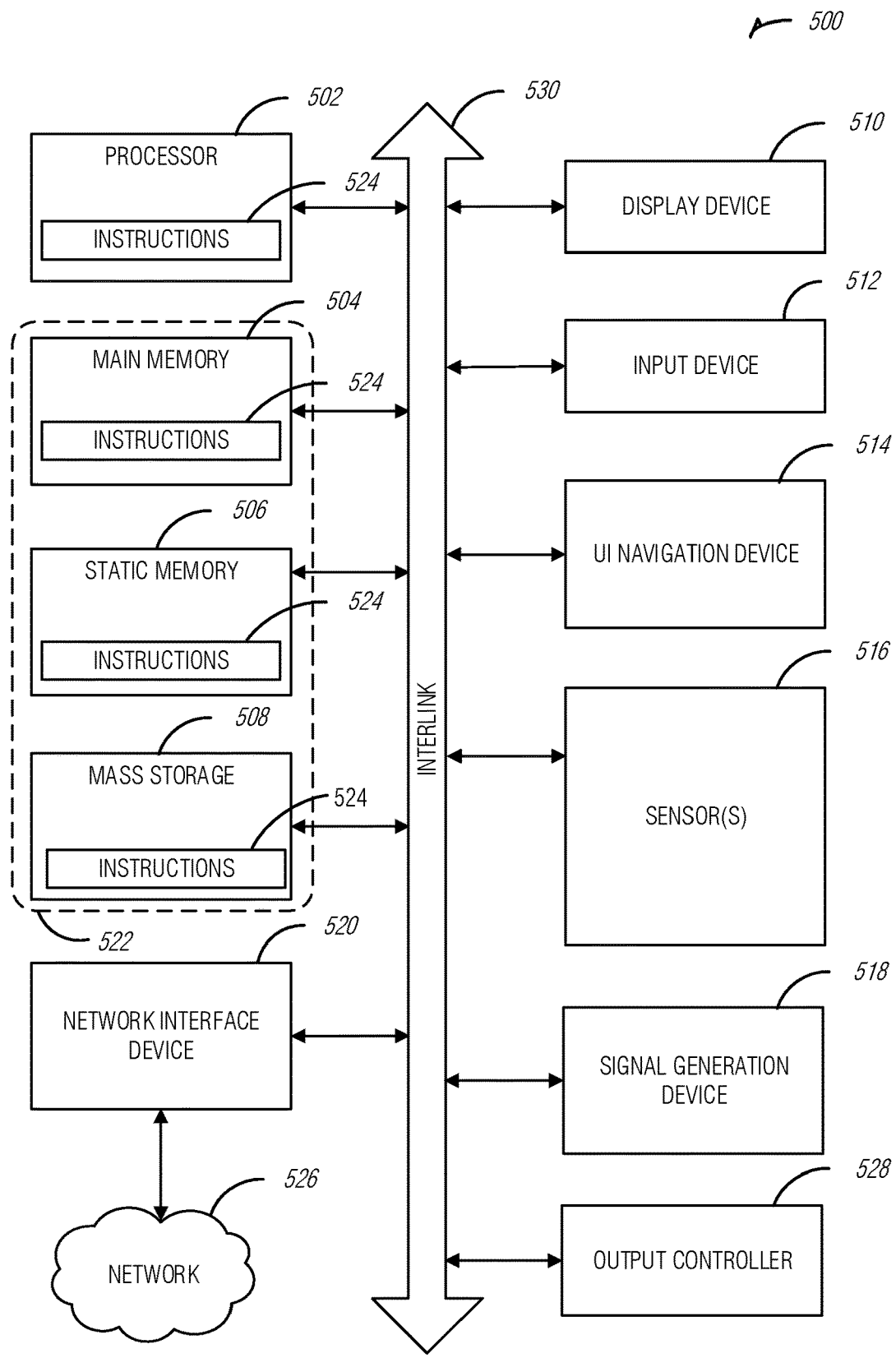
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 may be representative of the instructions 524, such as instructions 524 themselves or a format from which the instructions 524 may be derived. This format from which the instructions 524 may be derived may include source code, encoded instructions (e.g., in compressed or encrypted form), packaged instructions (e.g., split into multiple packages), or the like. The information representative of the instructions 524 in the machine readable medium 522 may be processed by processing circuitry into the instructions to implement any of the operations discussed herein. For example, deriving the instructions 524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 may include assembly, compilation, or interpretation of the information (e.g., by the processing circuitry) to create the instructions 524 from some intermediate or preprocessed format provided by the machine readable medium 522. The information, when provided in multiple parts, may be combined, unpacked, and modified to create the instructions 524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., 4G/5G cellular networks), Plain Old Telephone (POTS) networks, and wireless data networks (e.g., Institute of Electrical and Electronics Engineers (IEEE) 802.11 family of standards known as Wi-Fi®, satellite communications), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for measuring performance of a test scenario used in testing an autonomous driving safety requirement, the method comprising:
    defining a test environment for a test scenario, the test scenario used in a simulation of a test vehicle and a moving object that tests compliance with a minimum safe distance requirement of the autonomous driving safety requirement;
    defining input parameters for the test scenario, the input parameters including a maximum acceleration value of the test vehicle;
    identifying test procedures to use in the test scenario, wherein the test procedures define actions for testing the minimum safe distance requirement in the simulation, and wherein the minimum safe distance requirement relates to a distance between the test vehicle and the moving object in the simulation;
    identifying test parameters to use with the identified test procedures, wherein the test parameters define: (i) velocity, amount of braking, or timing of braking for the test vehicle, and (ii) velocity and rate of acceleration or deceleration for the moving object; and
    creating the test scenario for use in a test simulator of autonomous vehicle operation, wherein the test scenario applies the identified test procedures and the identified test parameters during the simulation of the defined test environment to identify a response of the test vehicle;
    wherein the test scenario includes the test vehicle applying the maximum acceleration value, and wherein the minimum safe distance requirement includes ensuring a minimum safe longitudinal distance between the test vehicle and the moving object when the test vehicle applies the maximum acceleration value.

2. The method of claim 1, wherein the input parameters include:
    a response time of the test vehicle;
    a minimum braking deceleration value of the test vehicle;
    a maximum velocity of the test vehicle; and
    a safe distance margin.

3. The method of claim 1, wherein the test scenario is a longitudinal following scenario for the test vehicle following the moving object on a roadway, wherein the moving object applies maximum braking deceleration.

4. The method of claim 3, wherein the longitudinal following scenario begins with:
    the test vehicle and the moving object each operating at a respective constant speed; or
    the moving object operating at a constant speed.

5. The method of claim 2, further comprising:
    defining logging parameters for the test scenario, the logging parameters including:
        a distance between the test vehicle and the moving object during a duration of the test scenario;
        a danger threshold time;
        the response time of the test vehicle;
        the maximum acceleration value of the test vehicle during the response time; and
        the minimum braking deceleration value of the test vehicle after the response time.

6. The method of claim 2, wherein characteristics of a roadway used in the test scenario include specifications for a curved roadway.

7. The method of claim 2, wherein a test passing criteria includes meeting the following conditions:
i) a distance is maintained between the test vehicle and the moving object during a duration of the test scenario;
ii) a response time of the test vehicle is equal to or smaller than a planned response time of the test vehicle;
iii) a maximum acceleration value of the test vehicle is equal to or smaller than a planned maximum acceleration value of the test vehicle; and
iv) a minimum braking value of the test vehicle during the response time is equal to or greater than a possible minimum braking value of the test vehicle, and the minimum braking value of the test vehicle after the response time is equal to or smaller than a maximum braking value of the test vehicle.

8. The method of claim 1, wherein the minimum safe distance requirement includes ensuring a minimum safe lateral distance between the test vehicle and the moving object when the test vehicle applies the maximum acceleration value.

9. The method of claim 8, wherein the test scenario is a cut-in scenario where the moving object performs a lateral motion towards a trajectory of the test vehicle.

10. The method of claim 1, wherein the minimum safe distance requirement is defined by a vehicle operational safety model, wherein the test vehicle implements the vehicle operational safety model using planning and control functions of autonomous driving software.

11. The method of claim 10, further comprising:
causing execution of the test scenario in the test simulator, to verify compliance of planning and control functions of the autonomous driving software with the minimum safe distance requirement.

12. The method of claim 1, wherein the moving object is a second vehicle.

13. At least one non-transitory machine-readable storage medium comprising instructions for measuring performance of a test scenario used in testing an autonomous driving safety requirement, which when executed by processing circuitry of a machine, cause the processing circuitry to:
define a test environment for a test scenario, the test scenario used in a simulation of a test vehicle and a moving object that tests compliance with a minimum safe distance requirement of the autonomous driving safety requirement;
define input parameters for the test scenario, the input parameters including a maximum acceleration value of the test vehicle;
identify test procedures to use in the test scenario, wherein the test procedures define actions for testing the minimum safe distance requirement in the simulation, and wherein the minimum safe distance requirement relates to a distance between the test vehicle and the moving object in the simulation;
identify test parameters to use with the identified test procedures, wherein the test parameters define: (i) velocity, amount of braking, or timing of braking for the test vehicle, and (ii) velocity and rate of acceleration or deceleration for the moving object; and
create the test scenario for use in a test simulator of autonomous vehicle operation, wherein the test scenario applies the identified test procedures and the identified test parameters during the simulation of the defined test environment to identify a response of the test vehicle;
wherein the test scenario includes the test vehicle applying the maximum acceleration value, and wherein the minimum safe distance requirement includes ensuring a minimum safe longitudinal distance between the test vehicle and the moving object when the test vehicle applies the maximum acceleration value.

14. The at least one non-transitory machine-readable storage medium of claim 13, wherein the input parameters include:
a response time of the test vehicle;
a minimum braking deceleration value of the test vehicle;
a maximum velocity of the test vehicle; and
a safe distance margin.

15. The at least one non-transitory machine-readable storage medium of claim 13, wherein the test scenario is a longitudinal following scenario for the test vehicle following the moving object on a roadway, wherein the moving object applies maximum braking deceleration.

16. The at least one non-transitory machine-readable storage medium of claim 15, wherein the longitudinal following scenario begins with:
The test vehicle and the moving object each operating at a respective constant speed; or
the moving object operating at a constant speed.

17. The at least one non-transitory machine-readable storage medium of claim 14, further comprising instructions for:
defining logging parameters for the test scenario, the logging parameters including:
a distance between the test vehicle and the moving object during a duration of the test scenario;
a danger threshold time;
the response time of the test vehicle;
the maximum acceleration value of the test vehicle during the response time; and
the minimum braking deceleration value of the test vehicle after the response time.

18. The at least one non-transitory machine-readable storage medium of claim 13, wherein the minimum safe distance requirement includes ensuring a minimum safe lateral distance between the test vehicle and the moving object when the test vehicle applies the maximum acceleration value.

19. A computing system for measuring performance of a test scenario used in testing an autonomous driving safety requirement, the computing system comprising:
a memory to store data associated with a test scenario, the test scenario to be used in a simulation of a test vehicle and a moving object that tests compliance with a minimum safe distance requirement of the autonomous driving safety requirement; and
processing circuitry configured to:
define input parameters for the test scenario, the input parameters including a maximum acceleration value of the test vehicle;
identify test procedures to use in the test scenario, wherein the test procedures define actions for testing the minimum safe distance requirement in the simulation, and wherein the minimum safe distance requirement relates to a distance between the test vehicle and the moving object in the simulation;
identify test parameters to use with the identified test procedures, wherein the test parameters define: (i) velocity, amount of braking, or timing of braking for the test vehicle, and (ii) velocity and rate of acceleration or deceleration for the moving object; and
create the test scenario for use in a test simulator of autonomous vehicle operation, wherein the test scenario applies the identified test procedures and the identified test parameters during the simulation of the defined test scenario to identify a response of the test vehicle;

wherein the test scenario includes the test vehicle applying the maximum acceleration value, and wherein the minimum safe distance requirement includes ensuring a minimum safe longitudinal distance between the test vehicle and the moving object when the test vehicle applies the maximum acceleration value.

20. The computing system of claim 19, wherein the input parameters include:
 a response time of the test vehicle;
 a minimum braking deceleration value of the test vehicle;
 a maximum velocity of the test vehicle; and
 a safe distance margin.

21. The computing system of claim 19, wherein the test scenario is a longitudinal following scenario for the test vehicle following the moving object on a roadway, wherein the moving object applies maximum braking deceleration.

22. The computing system of claim 21, wherein the longitudinal following scenario begins with:
 the test vehicle and the moving object each operating at a respective constant speed; or
 the moving object operating at a constant speed.

23. The computing system of claim 19, wherein the minimum safe distance requirement includes ensuring a minimum safe lateral distance between the test vehicle and the moving object when the test vehicle applies the maximum acceleration value.

24. The computing system of claim 23, wherein the test scenario is a cut-in scenario where the moving object performs a lateral motion towards a trajectory of the test vehicle.

25. The computing system of claim 19, wherein the moving object is a second vehicle.

26. The computing system of claim 19, wherein the processing circuitry is further configured to:
 define logging parameters for the test scenario, the logging parameters including:
  a distance between the test vehicle and the moving object during a duration of the test scenario;
  a danger threshold time;
  the response time of the test vehicle;
  the maximum acceleration value of the test vehicle during the response time; and
  the minimum braking deceleration value of the test vehicle after the response time.

27. The computing system of claim 19, wherein the minimum safe distance requirement is defined by a vehicle operational safety model, wherein the test vehicle implements the vehicle operational safety model using planning and control functions of autonomous driving software.

28. The at least one non-transitory machine-readable storage medium of claim 13, wherein the minimum safe distance requirement is defined by a vehicle operational safety model, wherein the test vehicle implements the vehicle operational safety model using planning and control functions of autonomous driving software.

* * * * *